US008594723B2

(12) United States Patent
Jain et al.

(10) Patent No.: US 8,594,723 B2
(45) Date of Patent: Nov. 26, 2013

(54) TECHNIQUES FOR INTERWORKING BETWEEN HETEROGENEOUS RADIOS

(75) Inventors: Puneet K. Jain, Hillsboro, OR (US);
Pouya Taaghoi, San Jose, CA (US);
Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 12/472,125

(22) Filed: May 26, 2009

(65) Prior Publication Data

US 2010/0304737 A1 Dec. 2, 2010

(51) Int. Cl.
*H04M 1/00* (2006.01)
*H04W 36/00* (2009.01)

(52) U.S. Cl.
USPC ............... 455/552.1; 455/553.1; 455/436

(58) Field of Classification Search
USPC .................... 455/553.1, 436, 552.1
See application file for complete search history.

(56) References Cited

U.S. PATENT DOCUMENTS

| 7,768,980 | B1 * | 8/2010 | Henry et al. ............. 370/338 |
|---|---|---|---|
| 2002/0136226 | A1 | 9/2002 | Christoffel et al. |
| 2004/0219948 | A1 | 11/2004 | Jones et al. |
| 2005/0048972 | A1 | 3/2005 | Dorenbosch et al. |
| 2007/0223516 | A1 | 9/2007 | Dunn et al. |
| 2007/0225039 | A1 | 9/2007 | Friday et al. |
| 2009/0017826 | A1 * | 1/2009 | Shaheen ............... 455/442 |
| 2009/0168676 | A1 * | 7/2009 | Olson ............... 370/311 |

FOREIGN PATENT DOCUMENTS

| EP | 1589777 | 10/2005 |
|---|---|---|
| KR | 20090039585 | 1/2009 |
| WO | 2009009560 | 1/2009 |
| WO | 2010138264 A2 | 12/2010 |
| WO | 2010138264 A3 | 12/2010 |

OTHER PUBLICATIONS

Office Action and Search Report received for Taiwanese Patent Application No. 099112338, mailed Apr. 8, 2013, 17 pages including 7 pages English translation.
Office Action and received for Japanese Patent Application No. 2012-513081, mailed Mar. 5, 2013, 4 pages including 2 pages English translation.
Office Action and received for Korean Patent Application No. 2011-7028050, mailed Feb. 22, 2013, 4 pages English translation.

* cited by examiner

*Primary Examiner* — Kamran Afshar
*Assistant Examiner* — Omoniyi Obayanju
(74) *Attorney, Agent, or Firm* — Kacvinsky Daisak PLLC

(57) ABSTRACT

Techniques for interworking between heterogeneous radios are described. An apparatus may comprise a first radio module operative to establish a first wireless link over a first wireless network with a first network device, a second radio module operative to establish a second wireless link over a second wireless network with a second network device, and a radio control module communicatively coupled to the first and second radio modules. The radio control module may be operative to send preregistration information for a mobile device to the second wireless network when connected to the first wireless network, determine whether to connect to the second wireless network, and establish the second wireless link over the second wireless network with the second network device using the preregistration information. Other embodiments are described and claimed.

24 Claims, 9 Drawing Sheets

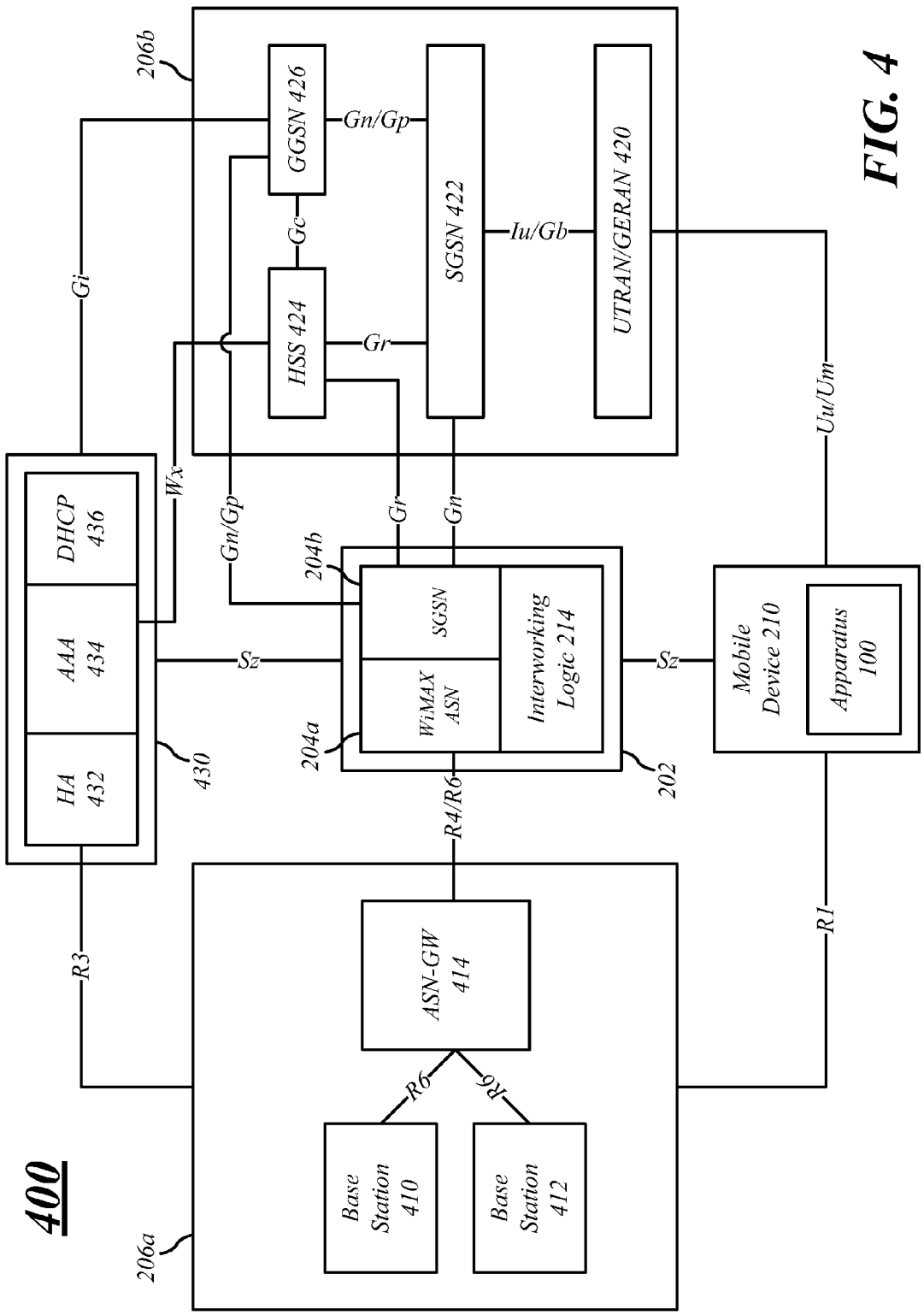

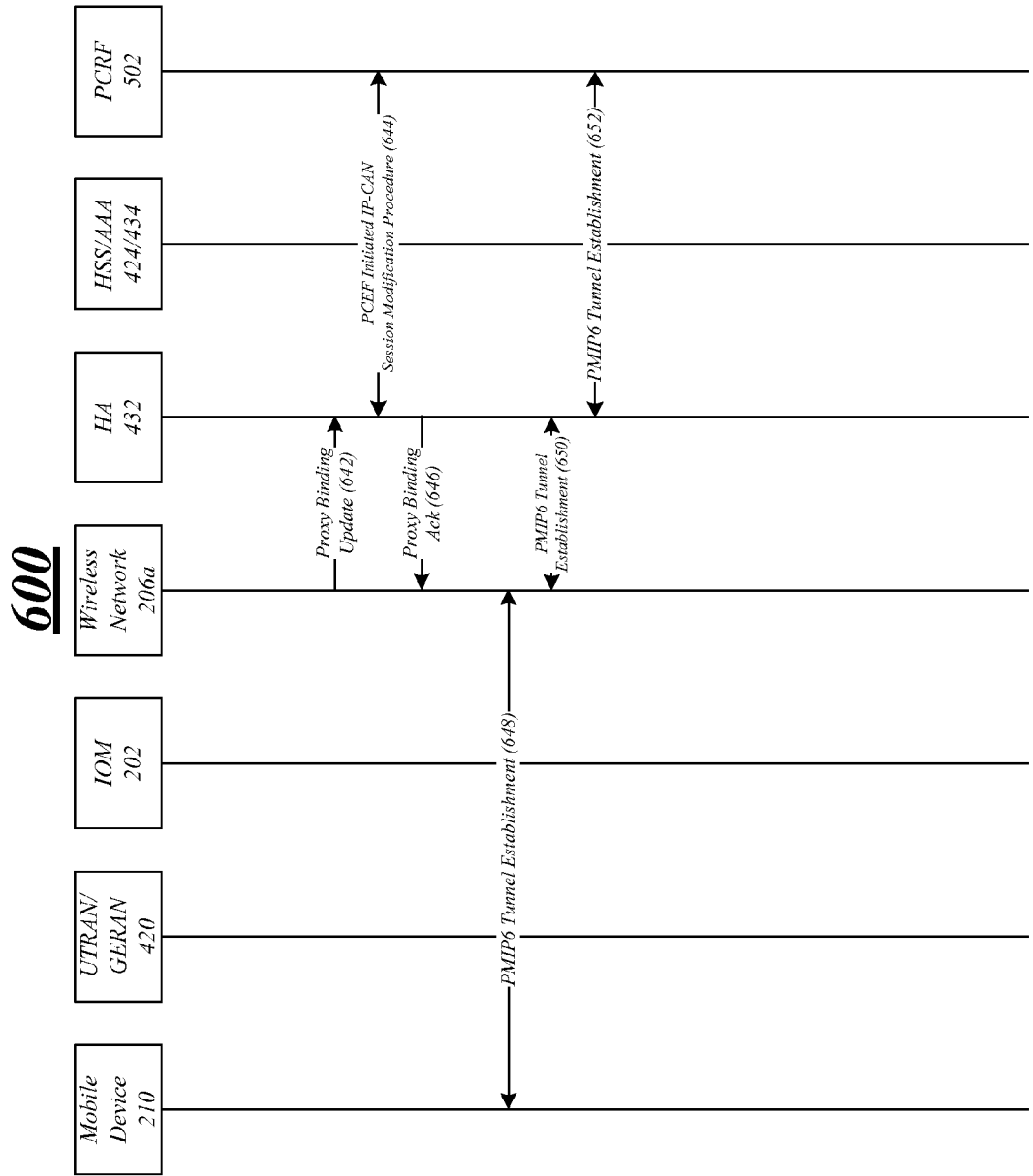

TECHNIQUES FOR INTERWORKING BETWEEN HETEROGENEOUS RADIOS

BACKGROUND

Various communication systems exist today to allow electronic devices, e.g., computers, mobile devices, and/or personal communication devices, to communicate and exchange information such as voice and multimedia information (e.g., video, sound, data) over local and distributed networks. Various wireless communication systems, allow wireless adapted computers to communicate with each other and wireless devices and computers connected to other networks such as Internet.

Wireless communication networks are being deployed pervasively in enterprise, residential, and public hotspots based on a variety of wireless standards. These wireless communication networks may employ multiple wireless technologies and wireless access standards. Accordingly, mobile wireless platforms are required to support multiple heterogeneous wireless devices (e.g., radios) to communicate over the multitude of different technology based wireless networks (e.g., heterogeneous wireless networks). To communicate across the heterogeneous wireless networks, wireless devices may include multiple wireless device technologies to seamlessly transition within a wireless network or across multiple wireless networks. Thus, there may be a need for a wireless network to support heterogeneous handovers to implement seamless connectivity between wireless devices. Heterogeneous handovers entail transitions across the different wireless networks.

BRIEF DESCRIPTION OF THE DRAWINGS

FIG. 4 illustrates one embodiment of a second system with multiple devices

FIG. 6B illustrates one embodiment of a second message flow.

DETAILED DESCRIPTION

Figure 1:
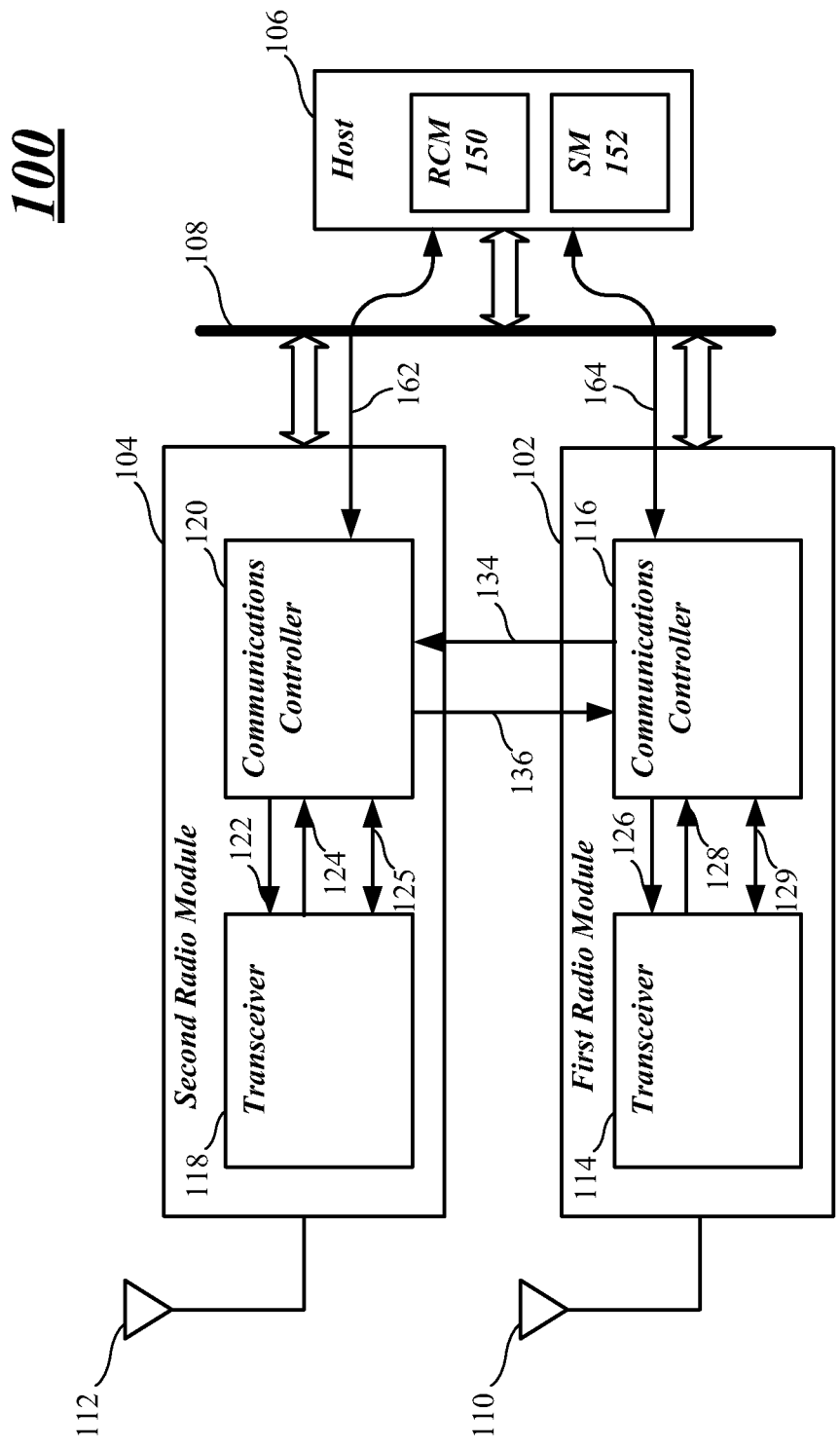
FIG. 1 illustrates one embodiment of an apparatus with multiple radios.

Techniques for interworking between heterogeneous radios are described. For instance, a mobile device may have multiple co-located heterogeneous radios capable of accessing different wireless networks. Embodiments are directed to single radio interworking techniques that allow multiple co-located heterogeneous radios to operate as essentially a single radio.

The single radio interworking techniques provide significant advantages over conventional dual-radio techniques. For instance, the single radio interworking techniques may reduce latency in handover operations between radios, as well as subsequent packet loss during handover transition periods. The single radio interworking techniques may also reduce power requirements, thereby extending battery life for a mobile device. The single radio interworking may also reduce interference and heat produced by a mobile device by having only one radio operating at a time. Furthermore, legacy wireless networks do not necessarily have to upgrade their existing infrastructure.

In one embodiment, an apparatus may be suitable for implementation in a mobile device. For instance, the apparatus may comprise a first radio module operative to establish a first wireless link over a first wireless network with a first network device, a second radio module operative to establish a second wireless link over a second wireless network with a second network device, and a radio control module communicatively coupled to the first and second radio modules. The radio control module may be operative to send preregistration information for a mobile device to the second wireless network when connected to the first wireless network, determine whether to connect to the second wireless network, and establish the second wireless link over the second wireless network with the second network device using the preregistration information.

The radio control module may be operative to control operations for each radio in accordance with a single radio architecture in cooperation with an interworking operations module associated with the first wireless network and the second wireless network. For instance, the radio control module may be operative to turn on a first transceiver for the first radio module and turn off a second transceiver for the second radio module. The first transceiver may connect to the first wireless network through the first network device when turned on. When connected to the first wireless network, the radio control module may send preregistration information for the mobile device to the second wireless network. When the radio control module determines to connect to the second wireless network, the radio control module may turn on a second transceiver for the second radio module and turn off a first transceiver for the first radio module. The second transceiver may connect to the second wireless network through the second network device when turned on using the preregister information for the mobile device.

In one embodiment, an apparatus may be suitable for implementation as part of a network infrastructure for a wireless communications network. For instance, an apparatus may comprise a memory to store an interworking operations module (IOM) and a processor communicatively coupled to the memory. The processor may execute the IOM. The IOM when executed by the processor operative to communicate control signals between a first wireless network and a second wireless network, the interworking operations module comprising first and second network interfaces operative to emulate respective network devices for the respective first and second wireless networks, and communicate preregistration information for a mobile device to the respective first and second wireless networks.

The first and second network interfaces may be operative to emulate respective network devices for the respective first and second wireless networks. For instance, the first and second network interfaces may emulate or mimic the behavior for a particular network element to enable pre-registration in a target network while connected to a source network. After pre-registration, when a mobile device decides to finally handover from the source network to the target network, the mobile device can switch on the radio for the target network (and switch off the radio for the source network) and seamlessly access the target network.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

The embodiments may generally relate to wireless communication networks. One embodiment relates to heterogeneous wireless cooperative communication networks to support communication over a multitude of wireless networks and nodes associated therewith using multiple heterogeneous wireless devices. In various embodiments, the heterogeneous wireless devices may comprise fixed, stationary or mobile wireless devices, including, but not limited to, multi-network/multifunctional wireless devices comprising multiple integrated wireless devices and mixed-network devices supporting multiple concurrent wireless technology standards. The embodiments are not limited in this context.

Examples of systems and devices in which embodiments described herein can be incorporated comprise wireless local area network (WLAN) systems, wireless metropolitan area network (WMAN) systems, wireless personal area networks (WPAN), wide area networks (WAN), cellular telephone systems, radio networks, computers, and wireless communication devices, among others. Those skilled in the art will appreciate, based on the description provided herein, that the embodiments may be used in other systems and/or devices. The embodiments, however, are not intended to be limited in context to the systems and/or devices described herein.

Embodiments of systems and nodes described herein may comply or operate in accordance with a multitude of wireless standards. For example, a system and associated nodes may comply or communicate in accordance with one or more wireless protocols, which may be defined by one or more protocol standards as promulgated by a standards organization, such as the Internet Engineering Task Force (IETF), International Telecommunications Union (ITU), the Institute of Electrical and Electronics Engineers (IEEE), and so forth. In the context of a WLAN system, the nodes may comply or communicate in accordance with various protocols, such as the IEEE 802.11 series of protocols (e.g., wireless fidelity or WiFi). In the context of a WMAN system, the nodes may comply or communicate in accordance with the IEEE 802.16 series of protocols such as the Worldwide Interoperability for Microwave Access (WiMAX), for example. Those skilled in the art will appreciate that WiMAX is a standards-based wireless technology to provide high-throughput broadband connections over long distances (long range). WiMAX can be used for a number of applications, including "last mile" wireless broadband connections, hotspots, cellular backhaul, and high-speed enterprise connectivity for business. In the context of a personal area network (PAN), the nodes may comply or communicate in accordance with the IEEE 802.15 series of protocols otherwise known as Bluetooth, for example. In the context of a MAN, the nodes may comply or communicate in accordance with the IEEE 802.20 series of protocols, for example. For mobility across multiple networks, the nodes may comply or communicate in accordance with the IEEE 802.21 series of protocols, for example. In other embodiments, the system and nodes may comply with or operate in accordance with various WMAN mobile broadband wireless access (MBWA) systems, protocols, and standards, for example. The embodiments, however, are not limited in this context.

Embodiments of systems and nodes described herein may comply or operate in accordance with a multitude of wireless technologies and access standards. Examples of wireless technologies and standards may comprise cellular networks (e.g., Global System for Mobile communications or GSM), Universal Mobile Telecommunications System (UTS), High-Speed Downlink Packet Access (HSDPA), Broadband Radio Access Networks (BRAN), General Packet Radio Service (GPRS), Third Generation Partnership Project (3GPP), and Global Positioning System (GPS), and Ultra Wide Band (UWB), among others. Systems and nodes in accordance with various embodiments may be arranged to support multiple heterogeneous wireless devices to communicate over these wireless communication networks. The embodiments, however, are not limited in this context.

Embodiments of systems and nodes described herein may comply with or operate in accordance with one or more cellular protocols or standards. These cellular standards or protocols may comprise, for example, GSM, Code Division Multiple Access (CDMA), CDMA 2000, Wideband Code-Division Multiple Access (W-CDMA), Enhanced General Packet Radio Service (EGPRS), among other standards, for example. The embodiments, however, are not limited in this context.

Embodiments of systems and nodes described herein may comprise wireless devices that may include multiple radios adapted to support multiple wireless standards, frequency, bandwidth, and protocols to seamlessly transition within a wireless network or across multiple wireless networks. Embodiments of systems and nodes described herein may be adapted to support heterogeneous handovers over one or more wireless networks and may be adapted to implement seamless connectivity between multiple wireless devices. Heterogeneous handovers entail transitions across different wireless networks including, but not limited to, those described herein (e.g., WLAN, WiFi, WMAN, WiMAX, cellular networks, UWB, Bluetooth, among others). By way of contrast, homogeneous handovers entail transitions across network points of attachments such as WLAN APs or WiMAX base stations. The embodiments are not limited in this context.

Wireless communication devices may comprise, for example, mobile devices and network points of attachments. Mobile devices and network points of attachments may be fixed, stationary or mobile depending on the particular environment or implementation and may communicate over the medium of free space generally referred to as the "air interface" (e.g., wireless shared media). Mobile devices may be adapted for short hop relay operation that cooperate between relatively nearby nodes and can simultaneously communicate cooperatively with a network point of attachment at another node. Mobile devices may be adapted for fast, short range, and flexible/ad hoc wireless transmissions over point-to-point relay links established between relatively nearby nodes.

In one embodiment, mobile devices may comprise wireless devices that comply with or operate in accordance with one or more protocols and/or standards, such as, for example, WiFi, Bluetooth, UWB, WiMAX or cellular protocols and/or standards. A mobile device may be fixed, stationary or mobile. For example, a mobile device may include, but is not necessarily limited to, a computer, server, workstation, laptop, ultra-laptop, handheld computer, telephone, cellular telephone, personal digital assistant (PDA), router, switch, bridge, hub, gateway, wireless device, multi-network/multifunctional devices, multiple integrated radio devices, mixed-network device supporting multiple concurrent radios, WiFi plus cellular telephone, portable digital music player (e.g., Motion Pictures Experts Group Layer 3 or MP3 players), pager, two-way pager, mobile subscriber station, printer, camera, enhanced video and voice device, and any other one-way or two-way device capable of communicating with other devices or base stations. Those skilled in the art will appreciate that mobile devices may be adapted to operate in accordance with standards-based wireless technologies such as WiFi, UWB, and Bluetooth to establish point-to-point links and to provide seamless wireless communications of voice, video, and data between both mobile and stationary mobile devices over short distances (short-range). The embodiments are not limited in this context.

Network points of attachment may comprise wireless devices adapted for long range, periodic, scheduled cooperative wireless transmissions over cooperative links between multiple nodes. In one embodiment, a network point of attachment may comprise wireless devices adapted to comply with or operate in accordance with WiFi, Bluetooth, UWB, WiMAX or cellular protocols and/or standards. Network points of attachment may include, but are not necessarily limited to, wireless APs, WiFi WLAN APs (e.g., hotspots), WiMAX wireless broadband base stations, and any other device capable of acting as a communication hub for wireless mobile devices to connect to a wired network from a wireless network and to extend the physical range of service of a wireless network. The embodiments are not limited in this context.

In one embodiment, the mobile devices and network points of attachment may be adapted to operate in a cooperative wireless network implementation. In one embodiment, the mobile devices may be adapted for fast, short range, and flexible/ad hoc relay wireless communications that serve point-to-point relay links between multiple nearby nodes in one wireless network. Network points of attachment may be adapted for long range, scheduled periodic wireless communications that serve cooperative links between multiple other nodes in another wireless network. This arrangement may leverage on special advantages of the two wireless networks: one to implement ad hoc Media Access Control (MAC) accesses to relay point-to-point messages, the other to implement a coordinated simultaneous uplink arrangement, for example. Embodiments of systems and nodes described herein may be arranged to provide seamless wireless short-range communications of voice, video, and data between mobile devices and corporative communications between mobile devices and network points of attachments. The embodiments are not limited in this context.

FIG. 1 illustrates one embodiment of an apparatus that may communicate across different types of wireless links. In particular, FIG. 1 shows an apparatus 100 comprising various elements. The embodiments, however, are not limited to these depicted elements. FIG. 1 shows that apparatus 100 may include a first radio module 102 and a second radio module 104, a host 106 and an interconnection medium 108. Each radio module 102, 104 may include one or more respective antennas 110, 112. These elements may be implemented in hardware, software, firmware, or in any combination thereof.

The apparatus 100 may be implemented as part of a mobile device or wireless device and may form part of a wired communications system, a wireless communications system, or a combination of both. For example, the mobile device may be arranged to communicate information over one or more types of wired communication links such as a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile device may be arranged to communicate information over one or more types of wireless communication links such as a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. In wireless implementations, the mobile device may comprise one more interfaces and/or components for wireless communication such as one or more transmitters, receivers, transceivers, amplifiers, filters, control logic, wireless network interface cards (WNICs), antennas, directional antennas, omni-directional antennas, and so forth. Although certain embodiments may be illustrated using a particular communications media by way of example, it may be appreciated that the described embodiments may be implemented using various communication media and accompanying technology.

Although apparatus 100 only shows two radio modules 102, 104, it may be appreciated that apparatus 100 may include more than two radio modules (and associated elements) as desired for a given implementation. Further, although apparatus 100 only shows a single antenna 110, 112 for each respective radio module 102, 104, it may be appreciated that apparatus 100 may include additional antennas for sharing with multiple transceivers. This may be desirable, for example, when a mobile computing device implements a wireless diversity scheme that utilizes an antenna array of two or more antennas to improve quality and reliability of a wireless link. An example of a wireless diversity scheme may include a multiple-input multiple-output (or variation thereof) system.

First radio module 102 and second radio module 104 (and/or additional radio modules) may communicate with remote devices across different types of wireless links. For example, first radio module 102 and second radio module 104 may communicate across various data networking links. Examples of such data networking links include wireless local area network (WLAN) links, such as IEEE 802.11 WiFi links. Further examples include wireless metropolitan area (WMAN) links, such as IEEE 802.16 WiMAX links, and personal area networks (PAN) links such as Bluetooth links, Ultra-Wideband (UWB)/WiMedia links, and so forth.

Additionally or alternatively, first radio module 102 and second radio module 104 (and/or additional radio modules) may communicate across wireless links provided by one or more cellular systems. Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For instance, second radio module 104 may additionally or alternatively communicate across non-cellular communications links.

In one embodiment, for example, first radio module 102 is a WiMAX device and second radio module 104 is a 3GPP device. In another embodiment, first radio module 102 is a 3GPP device and second radio module 104 is a WiMAX device. The embodiments, however, are not limited to these examples.

FIG. 1 shows that first radio module 102 includes a transceiver 114 and a communications controller 116. Transceiver 114 may transmit and receive wireless signals through antenna 110. As described above, these signals may be associated with wireless data networks, such as a WiMAX link. However, the embodiments are not limited to such.

Communications controller 116 controls the operation of transceiver 114. For instance, communications controller 116 may schedule transmission and reception activity for transceiver 114. Such control and scheduling may be implemented through one or more control directives 126. Control directive(s) 126 may be based on operational status information 128, which communications controller 116 receives from transceiver 114. Also, such control directives may be based on status messages 136 received from radio module 104.

As shown in FIG. 1, second radio module 104 includes a transceiver 118 and a communications controller 120. Transceiver 118 may also transmit and/or receive wireless signals through antenna 112. As described above, these signals may also be associated with wireless data networks, such as a 3GPP link. However, the embodiments are not limited to such.

Communications controller 120 controls the operation of transceiver 118. This may involve scheduling transmission and reception activity for transceiver 118. Such control and scheduling may be implemented through one or more control directives 122. Control directive(s) 122 may be based on operational status information 124, which communications controller 120 receives from transceiver 118. Also, such control directives may be based on status messages 134 received from radio module 102.

In addition to performing the control operations described above, communications controllers 116, 120 may provide coordination between radio modules 102, 104. This coordination may involve the exchange of information. For instance, FIG. 1 shows that communications controller 116 may send status messages 134 to controller 120. Conversely, communications controller 120 may send status messages 136 to communications controller 116. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces.

Host 106 may exchange information with radio modules 102, 104. As shown in FIG. 1, such exchanges may occur across interconnection medium 108. For instance, host 106 may send information to these radio modules for wireless transmission. Conversely, radio modules 102 and 104 may send information to host 106 that was received in wireless transmissions. In addition, host 106 may exchange information with radio modules 102 and 104 regarding their configuration and operation. Examples of such information include control directives sent from host 106 to radio modules 102 and 104.

Furthermore, host 106 may perform operations associated with higher layer protocols and applications. For instance, host 106 may provide various user applications, such as telephony, text messaging, e-mail, web browsing, word processing, video signal display, and so forth. In addition, host 106 may provide one or more functional utilities that are available to various protocols, operations, and/or applications. Examples of such utilities include operating systems, device drivers, user interface functionality, and so forth.

Interconnection medium 108 provides for couplings among elements, such as first radio module 102, second radio module 104, and host 106. Thus, interconnection medium 108 may include, for example, one or more bus interfaces. Exemplary interfaces include Universal Serial Bus (USB) interfaces, Serial Peripheral Interconnect (SPI) interfaces, Secure Digital Input Output (SDIO) interfaces, as well as various computer system bus interfaces. Additionally or alternatively, interconnection medium 108 may include one or more point-to-point connections (e.g., parallel interfaces, serial interfaces, etc.) between various element pairings.

Apparatus 100 enables interworking between multiple co-located and heterogeneous radios designed to work with different networks. For instance, 2G and 3G networks have enabled users around the world to access data on their handsets and laptops. However, as mobile data services increase and more personal computer (PC) clients start using the same broadband Internet applications "on the go" as they do at home, the expectation is for mobile data traffic to grow by at an exponential rate. This growth could easily exceed expectations with a surge in applications like rich social networking which combine Internet multimedia and mobility. Although 2G and 3G networks will continue to serve up voice and mobile data for some period of time, these networks will become capacity constrained as mobile broadband data use increases. Hence, service providers are looking to deploy new data-optimized networks such as WiMAX to offload data-intensive mobile broadband applications and satisfy this growth of data traffic. WiMAX will be deployed in entirely new spectrum, and will take some time to reach the ubiquitous coverage levels of 2G and 3G networks. Meanwhile, service operators will continue to use 2G and 3G networks for voice and narrower-band data, and likely deploy WiMAX for more data intensive applications. Consequently, a substantial need exists for a flexible network architecture for interworking heterogeneous networks and corresponding devices, such as between WIMAX and 3GPP networks and devices.

In general operation, apparatus 100 may engage in communications across multiple wireless links. However, as described above, co-located and heterogeneous radios may need to coordinate and implement interworking operations to maintain seamless operations between heterogeneous networks and devices. Furthermore, apparatus 100 may have multiple co-located and heterogeneous radios that are designed to operate as a single radio architecture. Having multiple radios operate within a single radio architecture may reduce complexity for apparatus 100, as well as conserve resources and power for apparatus 100.

To provide these and other advantages, apparatus 100 is designed to communicate and interoperate with an interworking operations module (IOM). The IOM and corresponding architecture may provide interworking services that ensure smooth, robust and seamless coordination of operations between multiple heterogeneous networks, devices and radios. In various embodiments, the IOM and accompanying architecture may provide improved dual radio handover that operates similar to a single radio architecture. For example, the IOM and accompanying architecture provides interworking operations between WiMAX and 3GPP systems and proposes a single radio handover solution to reduce overall latency of handovers and packet loss.

Figure 2:
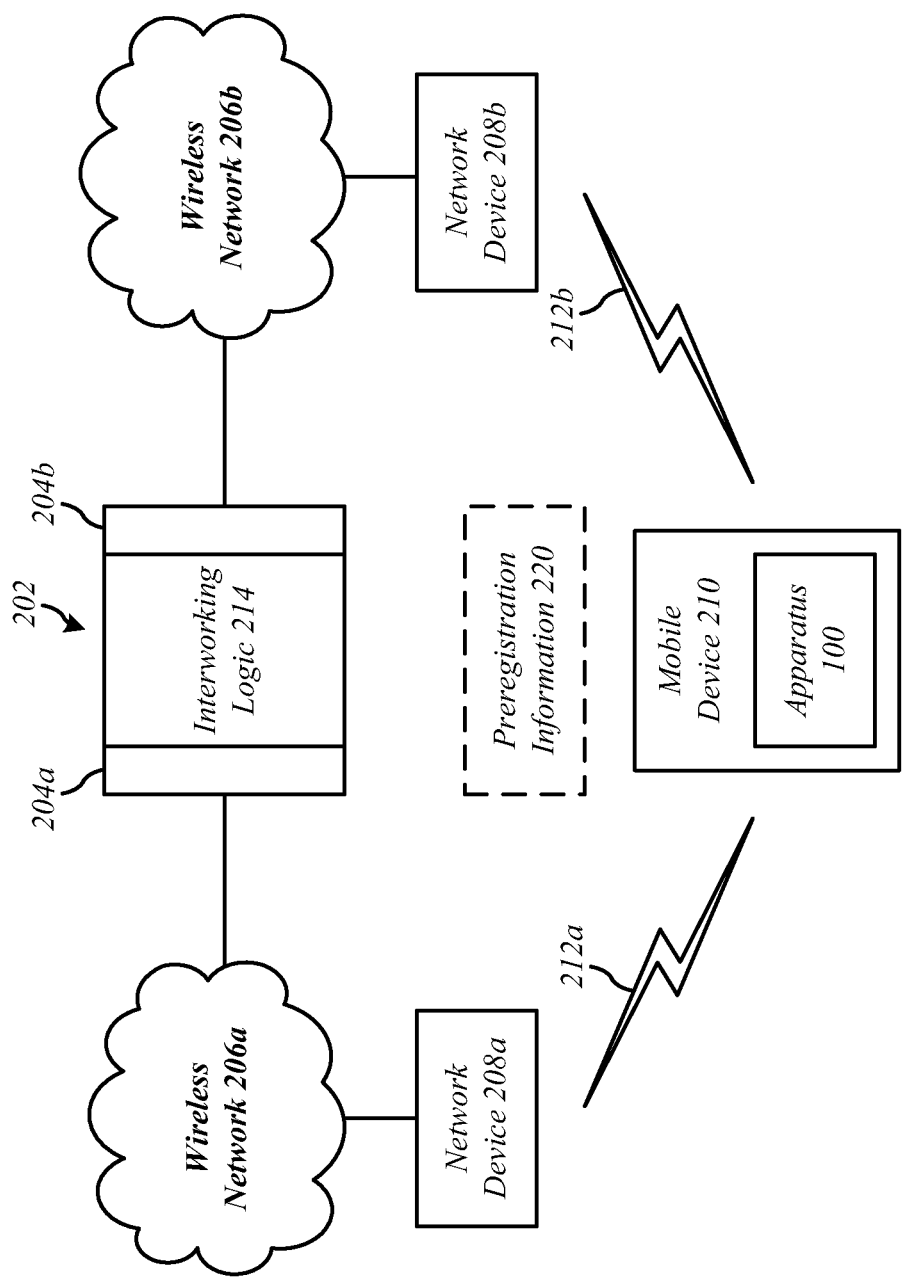
FIG. 2 illustrates one embodiment of a first system with multiple devices.

FIG. 2 illustrates one embodiment of a system 200 with multiple devices and networks. In the illustrated embodiment shown in FIG. 2, the system 200 may comprise an Interworking Operation Module (IOM) 202, multiple wireless networks 206a, 206b, multiple network devices 208a, 208b each a part of respective networks 206a, 206b, and one or more mobile devices 210. The IOM 202 may include, among other elements, interworking operations logic 214 and various network interfaces 204a, 204b each corresponding to respective networks 206a, 206b. The mobile device 210 may include, among other elements, the apparatus 100 as described with reference to FIG. 1. The mobile device 210 may communicate with the IOM 202 and wireless networks 206a, 206b via respective network devices 208a, 208b, and 208c over one or more wireless communications media 212a, 212b and 212c. Although FIG. 2 illustrates a limited number of elements by way of example and not limitation, it may be appreciated that the system 200 may include more or less elements and still fall within the intended scope of the embodiments.

The system 200 may include one or more mobile devices 210. The mobile device 210 may include the apparatus 100 having multiple radio modules 102, 104 designed to operate within a single radio architecture. For instance, the mobile device 210 includes the first radio module 102 operative to establish the first wireless link 212a over the first wireless network 206a with the first network device 208a. The mobile device 210 includes the second radio module 104 operative to establish the second wireless link 212b over the second wireless network 206b with the second network device 208b.

The mobile device 210 including the apparatus 100 may further include the radio control module 150 communicatively coupled to the first and second radio modules 102, 104. The radio control module 150 generally controls operations for the first and second radio module 102, 104. For instance, the radio control module 150 may send control directives to turn a particular radio on or off, take channel measurements, scan for radio signals, prepare for handover operations, generate pre-registration information, and so forth. The radio control module 150 may operate independently from, or cooperatively with, the communications controllers 116, 120 for the respective first and second radio modules 102, 104.

In various embodiments, the radio control module 150 may be arranged to send preregistration information 220 for the mobile device 210 to a target network when connected to a source network. For instance, the radio control module 150 may be arranged to send preregistration information 220 for the mobile device 210 to the second wireless network 206b when connected to the first wireless network 206a, and vice-versa. After sending the preregistration information 220 and pre-registering the mobile device 210 with a target network using the preregistration information 220, when the mobile device 210 decides to finally handover from the source network to the target network, the mobile device can switch on the radio or transceiver for the target network and switch off the radio or transceiver for the source network, and seamlessly access the target network.

The preregistration information 220 is associated with the mobile device 210 and comprises any information about the mobile device 210 and its operating capabilities that may assist a wireless network in establishing communications with the mobile device 210. For instance, the preregistration information may include information appropriate for discovering, identifying, authenticating and establishing wireless links with the mobile device 210. Examples of preregistration information may include without limitation authentication information, authorization information, location information, radio information, capabilities information, channel information, speed information, service information, provider information, bandwidth information, resource information, RF spectrum information, and any other information about the mobile device 210 stored or accessible by the mobile device 210 or the source network to which the mobile device 210 is currently connected. The preregistration information 220 and corresponding pre-registration operations with a target network allow a faster handover with less packet loss to the target network once the mobile device 210 determines to handover communications from the source network to the target network.

In one embodiment, for example, the mobile device 210 may be connected to the first wireless network 206a using the first radio module 102. Once connected to the first wireless network 206a, the radio control module 150 may cause pre-registration information 220 associated with the mobile device 210 to be sent to the second wireless network 206b. Once pre-registered with the second wireless network 206b, the radio control module 150 may determine to perform handover operations and connect to the second wireless network 206b. The radio control module 150 may cause the mobile device 210 to establish the second wireless link 212b over the second wireless network 206b with the second network device 208b using the preregistration information.

The radio control module 150 may be designed to control operations for each radio or transceiver in accordance with a single radio architecture in cooperation with the IOM 202 associated with the first and second wireless networks 206a, 206b. For instance, the radio control module 150 may be arranged to generate and send a control directive to turn on the first transceiver 114 for the first radio module 102, and generate and send a control directive to turn off the second transceiver 118 for the second radio module 120 at time $t_1$. The first transceiver 114 may connect to the first wireless network 206a through the first network device 208a once the first transceiver 114 has been turned on. Once connected to the first wireless network 206a, the radio control module 150 may send the preregistration information 220 for the mobile device 210 to the second wireless network 206b via the IOM 202. When the radio control module 150 determines to connect the mobile device 210 to the second wireless network 206b, the radio control module 150 may issue a control directive to turn on the second transceiver 118 for the second radio module 104, and issue another control directive to turn off the first transceiver 114 for the first radio module 102 at time $t_2$. The second transceiver 118 may connect to the second wireless network 206b through the second network device 208b once it has been turned on using the preregistration information 220 for the mobile device 210. In this manner, the apparatus 100 and the mobile device 210 only has a single radio operating at a given moment in time. It may be appreciated, however, that there may be some overlap in operations of the first and second transceivers 114, 118 due to timing considerations and ensuring stability between transition periods between switching from the source network to the target network.

In one embodiment, for example, when connected to the first wireless network 206a, the radio control module 150 may be operative to provide preregistration information 220 about the mobile device 210 to the second wireless network 206b via the IOM 202. Once pre-registered, the radio control module 150 may determine whether to connect to the second wireless network 206b at some future point in time. Once the radio control module 150 determines that handover to the second wireless network 206b is appropriate, the radio control module 150 may establish the second wireless link 212b over the second wireless network 206b with the second network device 208b in accordance with the determination.

In various embodiments, the first and second wireless networks 206a, 206b each comprise any one of a WPAN, WLAN, WMAN, cellular telephone network, and other wireless networks. It may be appreciated that the labels "first" and "second" as used herein are merely used as differentiators and are not meant to imply a particular order. In one embodiment, for example, the first wireless network 206a may comprise an IEEE 802.16 wireless network (e.g., WiMAX or WiMAX II), and the second wireless network 206b may comprise a 3GPP wireless network. Conversely, the first wireless network 206a may comprise a 3GPP wireless network, and the second wireless network 206b may comprise an IEEE 802.16 wireless network (e.g., WiMAX or WiMAXII). The embodiments are not limited, however, to these examples.

In various embodiments, the first and second radio modules 102, 104 each comprise any one of a WPAN, WLAN, WMAN, cellular telephone network, and other wireless transceivers or radios. The labels "first" and "second" as used herein are merely used as differentiators and are not meant to imply a particular order. In general, the first and second radio modules 102, 104 are designed to interoperate with the respective first and second wireless networks 206a, 206b. In one embodiment, for example, the first radio module 102 may comprise IEEE 802.16 user equipment (UE) and/or radio, and the second radio module 104 may comprise 3GPP UE and/or radio. Conversely, the first radio module 102 may comprise 3GPP UE and/or radio, and the second radio module 104 may comprise IEEE 802.16 UE and/or radio. The embodiments are not limited, however, to these examples.

The first and second radio modules 102, 104 may each comprise respective transceivers 114, 118 and respective communications controllers 116, 120. The communications controllers 116, 120 may be arranged to communicate status information to each other, and coordinate handover operations for the respective transceivers 114, 118 in accordance with the status information.

Additionally or alternatively, the communications controllers 116, 120 may be arranged to communicate status information with the radio control module 150. The radio control module 150 may be arranged to control or assist in handover operations for the transceivers 114, 118 via the respective communications controllers 116, 120 in accordance with the status information. The radio control module 150 may be implemented by the host 106. The radio control module 150 may also be implemented by other processors and processing systems implemented by the apparatus 100 (e.g., communications controllers 116, 120) or the mobile device 200.

The host 106 may also implement a security module 152. The security module 152 may provide security for communications between the apparatus 100 and other sub-systems internal to the mobile device 210, or other devices external to the mobile device 210 (e.g., the IOM 202, network devices 208a, 208b, other devices for wireless networks 206a, 206b, and so forth). The security module 152 may implement any known cryptographic or security techniques appropriate for a desired level of secure communications with other sub-systems or devices.

In various embodiments, the security module 152 may implement various Internet Protocol Security (IPSec) protocols as defined by the Internet Engineering Task Force (IETF). In general, IPSec is a suite of protocols for securing Internet Protocol (IP) communications by authenticating and encrypting each IP packet of a data stream. IPSec also includes protocols for establishing mutual authentication between agents at the beginning of the session and negotiation of cryptographic keys to be used during the session. IPSec can be used to protect data flows between a pair of hosts (e.g. computer users or servers), between a pair of security gateways (e.g. routers or firewalls), or between a security gateway and a host. IPSec is a dual mode, end-to-end, security scheme operating at the Internet Layer of the Internet Protocol Suite, which is approximately Layer 3 in the Open Systems Interconnect (OSI) model. Other Internet security systems may also be used, such as Secure Sockets Layer (SSL), Transport Layer Security (TLS) and Secure Shell (SSH), SSL Virtual Private Network (VPN), and other cryptographic schemes.

The system 200 may include the IOM 202. The IOM 202 is generally operative to communicate control signals (and data signals) between the first and second wireless networks 206a, 206b. The IOM 202 comprises multiple interfaces, with each interface capable of communicating with a given wireless network 206a, 206b. For example, the IOM 202 may include a first network interface 204a operative to communicate control signals with the first wireless network 206a. The IOM 202 may further include a second network interface 204b operative to communicate control signals with the second wireless network 206b. The first and second network interfaces 204a, 204b may be arranged to emulate respective network devices for the respective first and second wireless networks 206a, 206b. The first and second network interfaces 204a, 204b may also be arranged to communicate preregistration information 220 for the mobile device 210 to the respective first and second wireless networks 206a, 206b.

The first and second network interfaces 204a, 204b may be designed to emulate respective network devices 208a, 208b for the respective first and second wireless networks 206a, 206b. For instance, the first and second network interfaces 204a, 204b may emulate or mimic the behavior for a particular network element to enable pre-registration in a target network while connected to a source network. After pre-registration, when a mobile device decides to finally handover from the source network to the target network, the mobile device can switch on the radio for the target network and switch off the radio for the source network, and then seamlessly access the target network.

The IOM 202 may further include interworking logic 214. The interworking logic 214 may control the first and second network interfaces 204a, 204b. For instance, the interworking logic 214 may cause the first and second network interfaces 204a, 204b to emulate or mimic behavior for a particular network or network element. The interworking logic 214 may also modify behavior for a particular network or network element. The interworking logic 214 may also modify the behavior of the first and second network interfaces 204a, 204b when desired to implement interworking operations to facilitate communication of the preregistration information 220 or actually perform registration operations on behalf of the mobile device 210. The interworking logic 214 may add, delete or otherwise modify information for control signaling and messages that is necessary for interworking operations. The interworking logic 214 may also add, delete or otherwise modify information for control signaling and messages that is unnecessary for interworking operations. For instance, a control signal for one network may necessitate a certain number of options or response messages. The interworking logic 214 may determine ignore the options and response messages since it is not a true network element and the options and response messages are not needed for proper interworking operations. By way of further example, during normal processing of control signals, the SGSN 422 switches the network traffic to a second access after arrow 536. However, since the IOM 202 is performing preregistration operations only, the SGSN 422 will ignore the access switch. It may be appreciated that this is merely one example of the type of atypical behavior performed by the IOM 202 in response to the programming operations implemented for the interworking logic 214, and the embodiments are not limited in this context.

The mobile device 210 may communicate directly or indirectly with the IOM 202. For instance, when the mobile device 210 is connected to the first wireless network 206a via the network device 208a, the mobile device 210 may discover and establish a secure connection (or tunnel) to the IOM 202 via the first wireless network 206a. Conversely, when the mobile device 210 is connected to the second wireless network 206b via the network device 208b, the mobile device 210 may discover and establish a secure connection (or tunnel) to the IOM 202 via the second wireless network 206b. It may be appreciated that these indirect links may be replaced by a direct wireless link between the mobile device 210 and the IOM 202 when the IOM 202 is implemented separately from the first and second wireless networks 206a, 206b.

In various embodiments, the first and second network interfaces 204a, 204b each comprise any one of a WPAN, WLAN, WMAN, cellular telephone network, and other wireless network interfaces. The labels "first" and "second" as used herein are merely used as differentiators and are not meant to imply a particular order. In general, the first and second network interfaces 204a, 204b are designed to interoperate with the respective first and second wireless networks 206a, 206b. In one embodiment, for example, the first network interface 204a may comprise an IEEE 802.16 network interface, and the second network interface 204b may comprise a 3GPP network interface. Conversely, the first network interface 204a may comprise a 3GPP network interface, and the second network interface 204b may comprise an IEEE 802.16 network interface. The embodiments are not limited, however, to these examples.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 3:
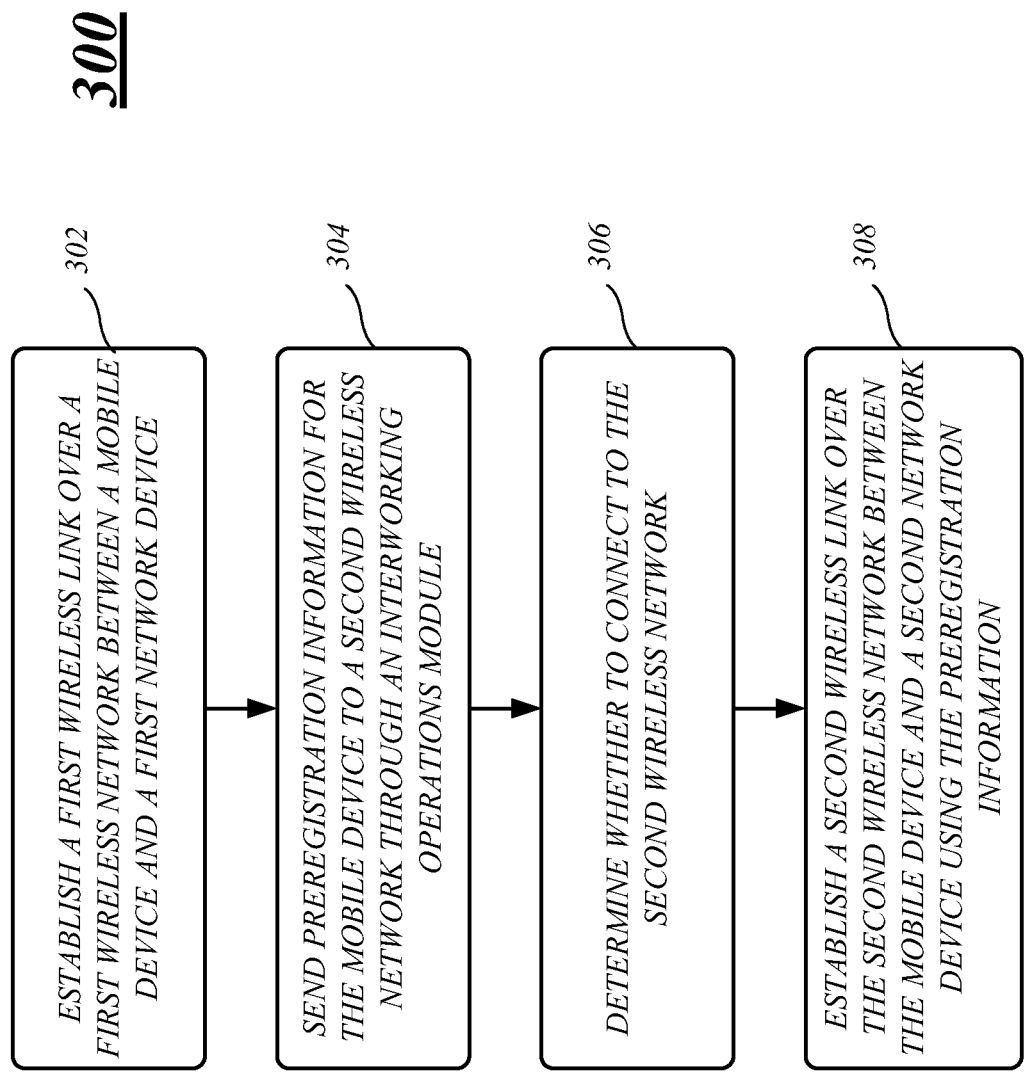
FIG. 3 illustrates one embodiment of a logic flow.

FIG. 3 illustrates one embodiment of a logic flow 300. The logic flow 300 may be representative of some or all of the operations executed by one or more embodiments described herein.

In the illustrated embodiment shown in FIG. 3, the logic flow 300 may establish a first wireless link over a first wireless network between a mobile device and a first network device at block 302. For example, the mobile device 210 may establish a first wireless link 212a over a first wireless network 206a between the mobile device 210 and a first network device 208a.

The logic flow 300 may send preregistration information for the mobile device to a second wireless network through an interworking operations module at block 304. For example, when the mobile device 210 is communicating with the first wireless network 206a via the first network device 208a, the radio control module 150 and/or the another network element from the first wireless network 206a may send preregistration information 220 for the mobile device 210 to the second wireless network 206b through the appropriate network interface (204a, 204b) of the IOM 202.

The logic flow 300 may determine whether to connect to the second wireless network at block 306. For example, once the mobile device 210 is pre-registered with the second wireless network 206b, the mobile device 210 may subsequently determine whether to connect to the second wireless network 206b. The mobile device 210 may initiate handover operations with or without the IOM 202, and the mobile device 210 and/or the second wireless network 206b may use the pre-registration information to accelerate the handover operations.

The logic flow 300 may establish a second wireless link over the second wireless network between the mobile device and a second network device using the preregistration information at block 308. For example, once the mobile device 210 determines that handover operations are appropriate, the mobile device 210 may establish the second wireless link 212b over the second wireless network 206b between the mobile device 210 and a second network device 208b using the preregistration information 220 previously sent to the second wireless network 206b.

The mobile device 210 may pre-register the mobile device 210 with the second wireless network 206b through the IOM 202. To accomplish this, the mobile device 210 may initiate discovery operations to discover the IOM 202 associated with the first wireless network 206a and the second wireless network 206b. The mobile device 210 may establish a connection with the IOM 202 through the first wireless network 206a. The connection may optionally be a secure connection. For example, the mobile device 210 and the IOM 202 may implement a secure connection using various security techniques, such as the security techniques provided by the security module 152 implemented by the host 106 of the apparatus 100 of the mobile device 210.

FIG. 4 illustrates a system 400. The system 400 may be similar to the system 200, with additional details provided for the IOM 202 and the first and second wireless networks 206a, 206b. The system 400 may illustrate a novel architecture for improved interworking between WiMAX and 3GPP systems in support of handover operations.

In one embodiment, the wireless network 206a may comprise an IEEE 802.16 WiMAX or WiMAX II network. For instance, the wireless network 206a may include multiple base stations 410, 412 and an Access Service Network (ASN) Gateway (GW) (ASN-GW) 414. The base stations 410, 412 may communicate with the ASN-GW 414 via R6 interconnections. The base stations 410, 412 may be representative of examples for the network device 208a. The ASN-GW 414 may communicate with the IOM 202 via R4/R6 interconnections.

In one embodiment, the wireless network 206b may comprise a 3GPP network, such as a GPRS/GSM network, GSM Edge Radio Access Network (GERAN), Universal Mobile Telecommunications System (UMTS) Terrestrial Radio Access Network (UTRAN). For instance, the wireless network 206b may include a UTRAN/GERAN 420 communicatively coupled to a Serving GPRS Support Node (SGSN) 422 via an Iu/Gb interconnect. The SGSN 422 may be communicatively coupled to a Home Subscriber Server (HSS) 424 via a Gr interconnect. The SGSN 422 may also be communicatively coupled to a Gateway GPRS Support Node (GGSN) 426 via a Gn/Gp interconnect. The HSS 424 and the GGSN 426 may be communicatively coupled via a Gc interconnect.

The system 200 may further include a network device 430 implementing various other system operations for one or both wireless networks 206a, 206b. The network device 430 may implement various "core network" functionality, such as a Home Agent (HA) node 432, an Access, Authorization and Accounting (AAA) node 434, and a Dynamic Host Configuration Protocol (DHCP) server 436. The network device 430 may be implemented in either or both of the wireless networks 206a, 206b. Additionally or alternatively, portions of the network device 430 may be implemented in each of the wireless networks 206a, 206b.

The network device 430 may be arranged to communicate with the IOM 202 and one or both wireless networks 206a, 206b over various interfaces and interconnects as appropriate for each endpoint. For instance, the wireless network 206a may communicate with the HA node 432 via an R3 interconnect. The AAA node 434 may communicate with the HSS 424 via a Wx interconnect. The DHCP server 436 may communicate with the GGSN 426 via a Gi interconnect.

The IOM 202 may be arranged to communicate with the mobile device 210, the wireless networks 206a, 206b, and the network device 430. In the illustrated embodiment shown in FIG. 4, the IOM 202 includes the first network interface 204a that emulates a WiMAX ASN logical entity. The first network interface 204a may communicate with the ASN-GW 414 over R4 and/or R6 interconnects. The IOM 202 includes the second network interface 204b that emulates a SGSN logical entity. The second network interface 204b may communicate with the SGSN 422 over a Gn interconnect, the HSS 424 over a Gr interconnect, and the GGSN 426 over a Gn/Gp interconnect. The IOM 202 and the mobile device 210 may communicate over a Sz interconnect through one or both of the first and second wireless network 206a, 206b. As with the mobile device 210, the IOM 202 and the network device 430 may interact over a Sz interconnect.

To perform handover operations from WiMAX to 3GPP, the IOM 202 utilizes the network interface 204a to communicate with the wireless network 206a, and the network interface 204b to communicate with the wireless network 206b. From the perspective of the wireless networks 206a, 206b, the wireless network interfaces 204a, 204b appear in structure and function to be normal logical entities for each of the respective wireless networks 206a, 206b.

The IOM 202 may be implemented within either or both of the wireless networks 206a, 206b. The IOM 202 may be implemented, for example, in the 3GPP non-access stratum (NAS). In the non-roaming case, the IOM 202 may be located in the Home Public Land Mobile Network (HPLMN). The address of the IOM 202 may be pre-configured on the mobile device 210 or it may be discovered through a Domain Name Service (DNS) query. In the roaming case, the IOM 202 may be located in the Visited Public Land Mobile Network (VPLMN) or HPLMN, and may be discovered through a DNS query. Generic IP layer security as specified by IPSec may be used (e.g., TS 33.234) may be used for transport connections between the mobile device 210 and the IOM 202. The reference point Sz enables interactions between the mobile device 210 and the IOM 202. In one embodiment, these messages are transported as opaque containers without modifications by the 3GPP and Mobile WiMAX accesses.

FIGS. 5A, 5B and 6A, 6B assume that the first wireless network 206a is a WiMAX network and the second wireless network 206b is a 3GPP network. As such, some or all of the operations and messages described in the message flows 500, 600 may be defined in the WiMAX Forum Technical Information Release 1.0 and 1.5, including the Networking Group (NWG) Stage 2 Specification WMF-T32-001-R010v04 Network Stage 2 Part 0, WMF-T32-002-R010v04 Network Stage 2 Part 1, WMF-T32-003-R010v04 Network Stage 2 Part 2, WMF-T32-004-R010v04 Network Stage 2 Part 3, and WMF-T32-005-R010v04 Network Stage 2 Abbreviations (2/3/2009) (collectively referred to as "NWG Stage 2 Specification"), and their progeny, revisions and variants; and the NWG Stage 3 Specification WMF-T33-001-R010v04 Network Stage 3 Base, WMF-T33-002-R010v04 Network Stage 3 Prepaid Accounting, WMF-T33-003-R010v04 Network Stage 3 R6-R8 ASN Mobility, and WMF-T33-004-R010v04 Network Stage 3 Evolution Hooks (2/3/2009) (collectively referred to as "NWG Stage 3 Specification"), and their progeny, revisions and variants. Further, some or all of the operations and messages described in the message flows 500, 600 may be defined in 3GPP TS 23.060 titled General Packet Radio Service (GPRS), Service Description, Versions R99 (4/28/1999), Rel-4 (3/22/2001), Rel-5 (3/14/2002), Rel-6 (12/16/2004), Rel-7 (3/15/2007), Rel-8 (12/11/2008), Rel-9 (3/16/2009) (collectively referred to as "TS 23.060"), and their progeny, revisions and variants. The embodiments, however, are not limited to these examples.

Figure 5A:
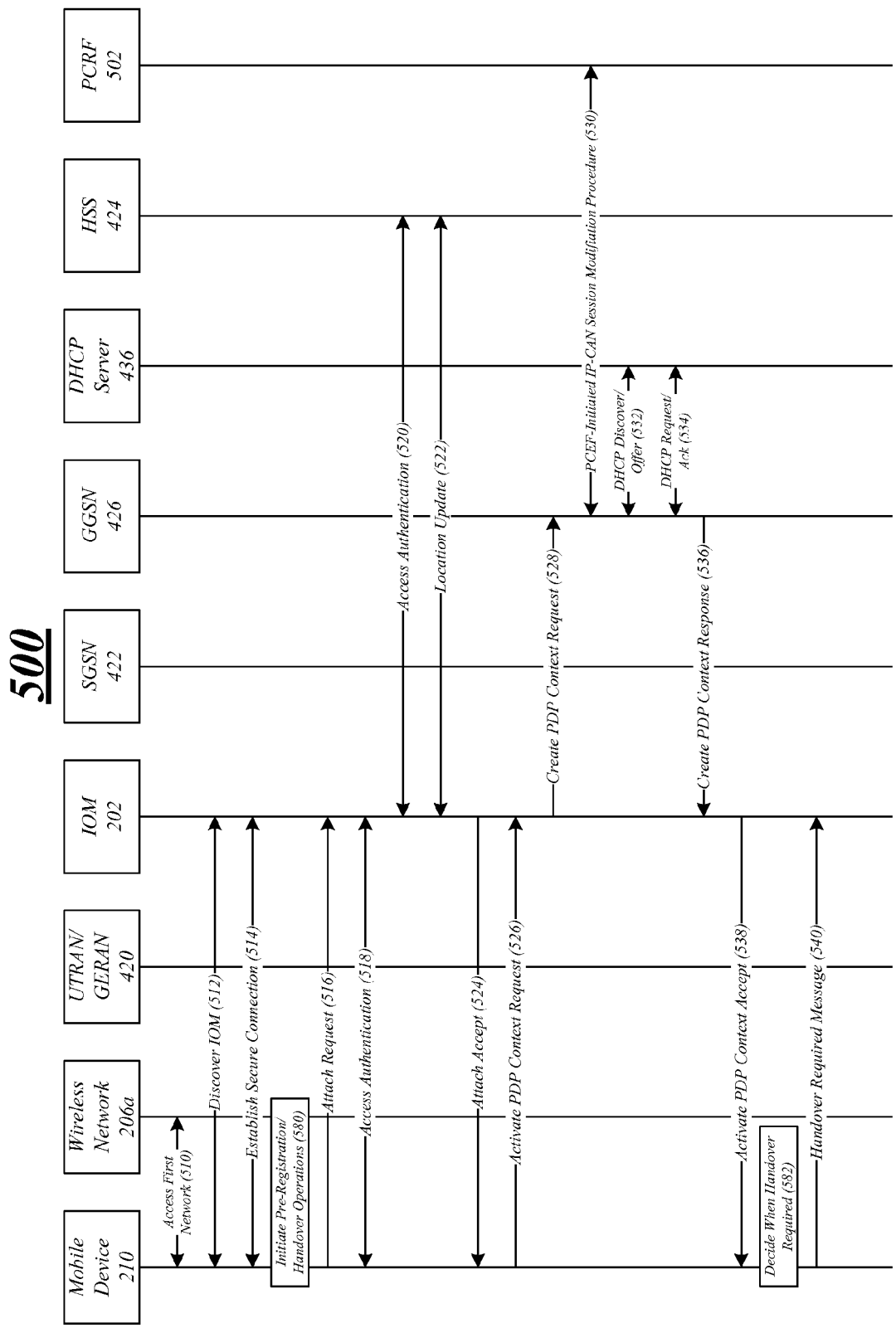
FIG. 5A illustrates one embodiment of a first message flow.
Figure 5B:
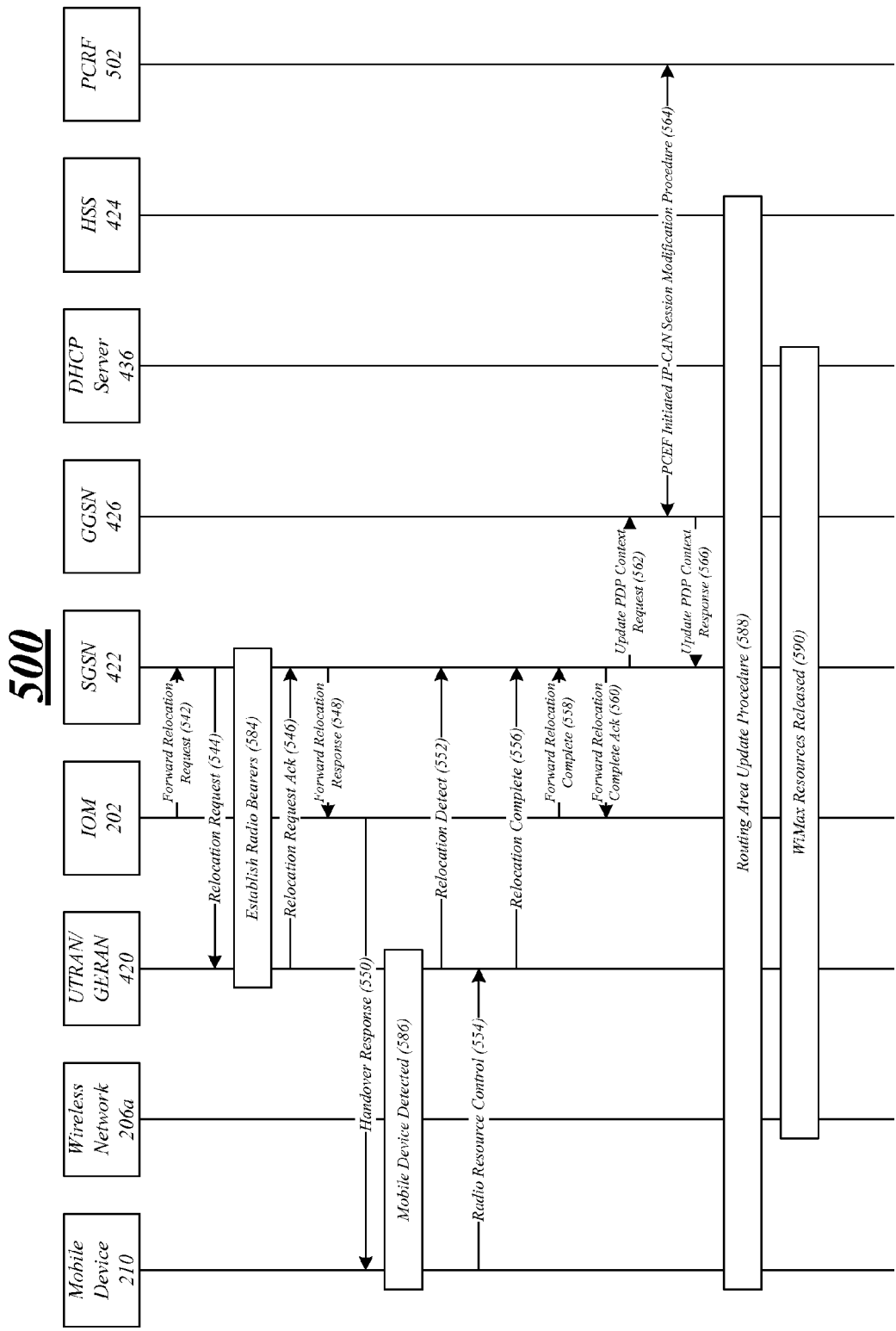
FIG. 5B illustrates one embodiment of a first message flow.

FIGS. 5A, 5B illustrate one embodiment of a message flow 500. The message flow 500 is an exemplary implementation for operations and message flow when performing handover from the first wireless network 206a to the second wireless network 206b.

As shown in FIG. 5A, the mobile device 210 uses the first radio module 102 to access the first wireless network 206a as a WiMAX system at arrow 510. The mobile device 210 is being served by the HA 432. The mobile device 210 discovers an IOM 202 in the first wireless network 206a by using a DNS query at arrow 512. If the mobile device 210 is not roaming and is provisioned with an address for the IOM 202, the discovery procedure for the IOM 202 may be skipped. When the mobile device 210 successfully discovers the IOM 202 it establishes a secure connection or tunnel with the IOM 202 at arrow 514, such as a secure IP connection. Once a secure IP connection has been established, the mobile device 210 can perform pre-registration and handover operations to the second wireless network 206b (e.g., 3GPP access). Subsequent messages between the mobile device 210 and IOM 202 are transferred over the secure IP connection.

Based on some defined criteria, the mobile device 210 decides to initiate pre-registration operations and handover operations to the second wireless network 206b at block 580. The handover determination may be made in accordance with any number of criteria, including radio measurements, channel measurements, received signal strength, communications applications implemented by the mobile device 210, bandwidth requirements, network availability, movement of the mobile device 210, speed of the mobile device 210 (e.g., when in a moving vehicle), operating environment, and so forth. The pre-registration determination may be made in accordance with any number of criteria, including a defined time after connection to the first wireless network 206a or any one of the criteria used for the handover determination. The detailed criteria for initiating the pre-registration and handover operations are implementation specific, and the embodiments are not limited in this context.

Once the mobile device 210 determines to initiate pre-registration operations, the mobile device 210 sends an Attach Request message to the IOM 202 over the Sz interconnect at arrow 516. The network interface 204b of the IOM 202 emulates a SGSN for the second wireless network 206b.

The IOM 202 contacts the HSS 424 over the Gr interconnect and authenticates the mobile device 210 for UTRAN/GERAN access at arrows 518, 520. The authentication operations may be those as set forth in TS 23.060, for example.

After successful authentication, the IOM 202 performs a location update procedure with HSS as specified in TS 23.060, for example, at arrow 522. The IOM 202 sends an Attach Accept message to the IOM 202 at arrow 524. The attach procedure is performed according to TS 23.060, for example.

The mobile device 210 performs the activate Packet Data Protocol (PDP) context activation according to TS 23.060, for example, at arrows 526, 528, 530, 532 and 534. For instance, the IOM 202 creates a PDP context request and sends to the GGSN 426 at arrow 528. The GGSN 426 sends a request to initiate a Policy Control and Charging Enforcement Function (PCEF) initiated Internet Protocol Connectivity Access Network (IP-CAN) Session Modification procedure at arrow 530. In the 3GPP IP Multimedia Subsystem (IMS) architecture, the IP-CAN is the term given to the access network which provides IP connectivity to the IMS subscriber. Examples include GPRS Digital Subscriber Line (DSL) and WiMAX networks. The PCEF is a functional entity of the 3GPP Policy and Charging Control (PCC) architecture. The role of the PCEF is to act as an enforcement point for IP-CAN policy decisions made by the Policy Control and Charging Rules Function (PCRF) 502. It is typically located within the IP-CAN gateway, such as the GGSN 426 or Broadband Remote Access Server (B-RAS). The B-RAS is a functional entity of DSL networks which is effectively the first point at which a subscriber's IP traffic is processed for onward routing. Typically housed in the Local Exchange or Central Office, the B-RAS can also be responsible for IP address allocation and termination of PPP links. In modern DSL networks, it is not uncommon to see the functionality of a B-RAS contained within an IP-DSLAM.

Once the PCEF initiated IP-CAN Session Modification procedure is completed, the GGSN 426 and the DHCP 436 performs discovery/offer operations and acknowledgements at arrows 532, 534. The GGSN 426 sends a Create PDP Context Response message to the IOM 202 at arrow 536. The IOM 202 sends an Activate PDP Context Accept message to the mobile device 210 at arrow 538.

No 3GPP radio bearer is established at this point since the mobile device 210 is still using the first wireless network 206a (e.g., WiMAX radio network). In other words, the IOM 202 does not request a radio bearer establishment for the second wireless network 206b at this point. After the pre-registration operations are completed, the handover to the second wireless network 206b may be based on another set of defined criteria. For instance, the handover may be based on radio measurements. The handover operations may be started immediately or may be delayed. In case the handover to 3GPP access is delayed after pre-registration, the mobile device 210 decides when the handover is required (e.g. based on radio measurements of current and available radio channels) at block 582.

When handover is determined as appropriate, the mobile device 210 sends a Handover Required message to the IOM 202 in order to indicate that it wants to start handover operations to access the second wireless network 206b at arrow 540.

As shown in FIG. 5B, the IOM 202 may initiate a hard handover and Serving Radio Network Subsystem (SRNS) relocation procedure as defined by TS 23.060. For instance, the IOM 202 may send a Forward Relocation Request message to the SGSN 422 at arrow 542. The SGSN 422 may send a Relocation Request message to the UTRAN/GERAN 420 at arrow 544. The UTRAN/GERAN 420 may establish radio bearers at block 584. The UTRAN/GERAN 420 may send a Relocation Request Acknowledgement message to the SGSN 422 at arrow 546. The SGSN may send a Forward Relocation Response message to the IOM 202 at arrow 548. The IOM 202 sends a Handover Response message to the mobile device 210 after the radio access bearers are successfully established at arrow 550.

The mobile device 210 is detected by the UTRAN/GERAN 420 of the second wireless network 206b at block 586. The UTRAN/GERAN 420 sends a Relocation Detect message to the SGSN 422 at arrow 552. The mobile device 210 moves to the UTRAN/GERAN access and sends a Radio Resource Control (RRC) message to indicate that the relocation is complete at arrow 554. The UTRAN/GERAN 420 sends a Relocation Complete message to the SGSN 422 at arrow 556, and the forward relocation procedure is completed as defined in TS23.060. The IOM 202 sends a Forward Relocation Complete message to the SGSN 422 at arrow 558. The SGSN sends a Forward Relocation Complete Acknowledgement message to the IOM 202 at arrow 560.

The radio bearers are updated as defined in TS 23.060 at arrows 562, 564 and 566. For instance, the SGSN 422 sends an Update PDP Context Request message to the GGSN 426 at arrow 562. The GGSN 426 sends a message to the PCRF 502 to initiate a PCEF Initiated IP-CAN Session Modification procedure by the PCRF 502 at arrow 564. The GGSN 426 sends an Update PDP Context Response message to the SGSN 422 at arrow 566.

The mobile device 210 starts the Routing Area Update procedure for handover to the GERAN/UTRAN 420 at block 588. The WiMAX resources are released by the HA 432 by sending a binding revocation at block 590.

Figure 6A:
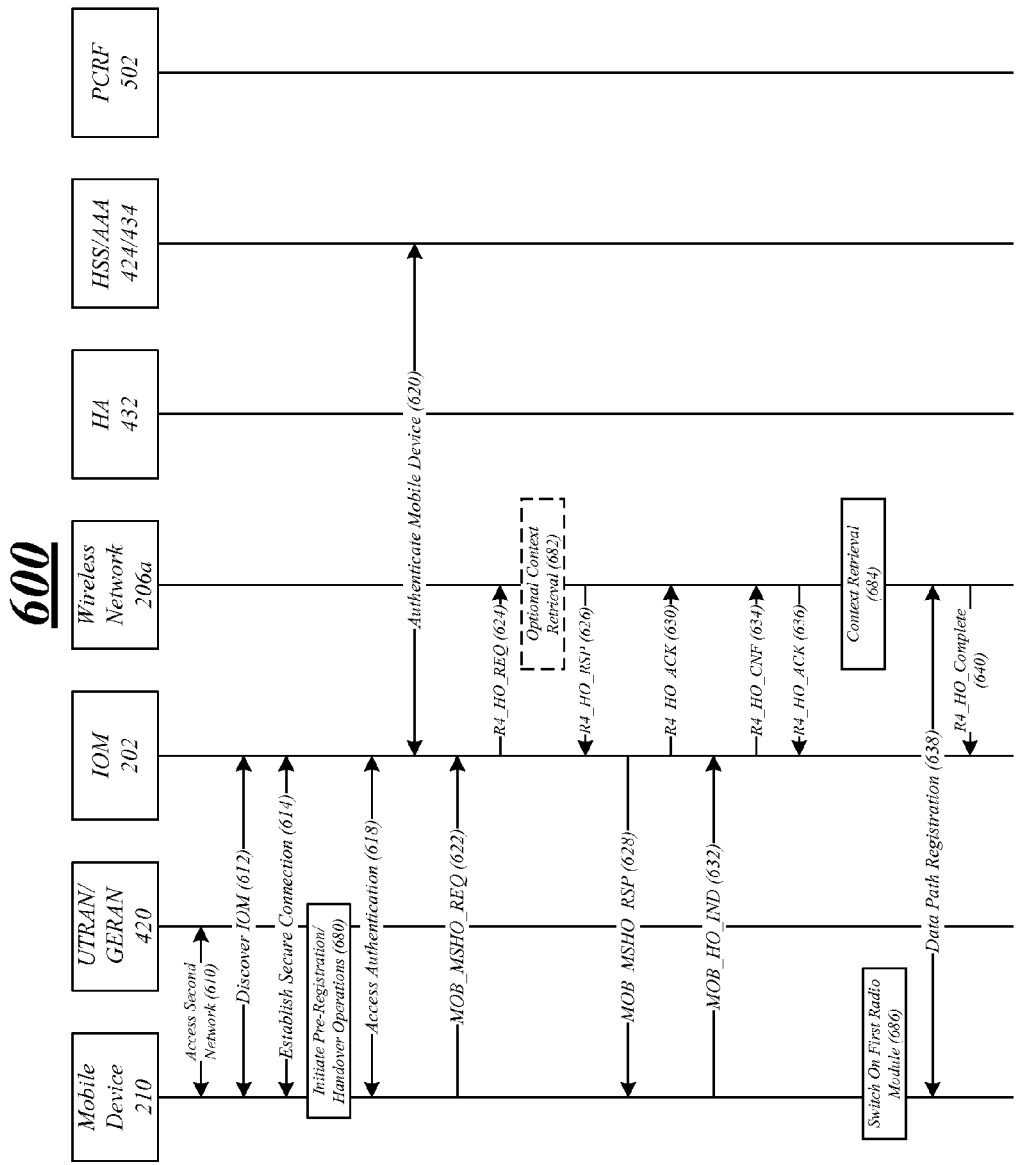
FIG. 6A illustrates one embodiment of a second message flow.

FIGS. 6A, 6B illustrate one embodiment of a message flow 600. The message flow 600 is an exemplary implementation for operations and message flow when performing handover from the second wireless network 206b to the first wireless network 206a.

As shown in FIG. 6A, the mobile device 210 uses the second radio module 104 to connect to the second wireless network 206b at arrow 610. For instance, the mobile device 210 accesses the 3GPP access system and is being served by the GGSN 426.

The mobile device 210 discovers an IOM 202 in the serving network by using the IOM 202 discovery procedure at arrow 612. If the mobile device 210 is not roaming and is provisioned with an address for the IOM 202, the discovery procedure for the IOM 202 may be skipped. When the mobile device 210 successfully discovers the IOM 202 it establishes a secure connection with this IOM 202 at arrow 614. After that, the mobile device 210 can use the enhanced procedures for pre-registration and handover to the first wireless network 206a. Subsequent messages between the mobile device 210 and the IOM 202 are transferred over the secure IP connection.

Based on some defined criteria, the mobile device 210 decides to initiate pre-registration and handover operations to the first wireless network 206a (e.g., a WiMAX access system) at block 680. The handover determination may be made in accordance with any number of criteria, including radio measurements, channel measurements, received signal strength, communications applications implemented by the mobile device 210, bandwidth requirements, network availability, movement of the mobile device 210, speed of the mobile device 210 (e.g., when in a moving vehicle), operating environment, and so forth. The pre-registration determination may be made in accordance with any number of criteria, including a defined time after connection to the second wireless network 206b or any one of the criteria used for the handover determination. The detailed criteria for initiating the pre-registration and handover operations are implementation specific, and the embodiments are not limited in this context.

The mobile device 210 performs access, authentication and authorization (AAA) operations for mobile WiMAX at arrows 618, 620. For instance, the mobile device 210 performs Access Authentication operations at arrow 618. The IOM 202 behaves as a WiMAX authenticator and authenticates the mobile device 210 by contacting the 3GPP AAA node 434 (e.g., AAA Server/Proxy) at arrow 620. The AAA node 434 returns a Public Data Network or Packet Data Network (PDN) Gateway (GW) (PDN-GW) address to the IOM 202. Within the Evolved Packet Core (EPC) the PDN-GW terminates the SGi interface and is responsible for functions such as policy enforcement based around the monitoring of traffic characteristics on a subscriber by subscriber basis to ensure that the agreed traffic policy is adhered to properly. Other tasks include packet filtering and screening for things such as Malware and unauthorized data types, as well as accounting, IP Address Allocation and Lawful Interception.

The mobile device 210 sends a MOB_MSHO_REQ message to the IOM 202 which includes one or more potential target base stations for the first wireless network 206a (e.g., base stations 410, 412) at arrow 622. The network interface 204a of the IOM 202 emulates the serving WiMAX ASN. The IOM 202 sends an R4_HO_REQ message to the ASN-GW 414 of the first wireless network 206a at arrow 624. The ASN-GW 414 may optionally perform context retrieval with an authenticator ASN at block 682. The ASN-GW 414 sends an R4_HO_RSP message to the IOM 202 at arrow 626. The IOM 202 sends a MOB_BSHO_RSP message to the mobile device 210 at arrow 628. The IOM 202 also sends an R4_HO_ACK message to the ASN-GW 414 at arrow 630. Further details for operations and messages represented by arrows 622-630 and block 682 may be found in Section 4.7.2.1 of the NWG Stage 3 Specification.

If the mobile device 210 accepts one of the target base stations offered by the IOM 202 in the MOB_BSHO_RSP message as a handover target, the mobile device 210 sends a MOB_HO_IND message to specify which target base station has been selected at arrow 632. For instance, the IOM 202 may send an R4_HO_CNF message to the ASN-GW 414 at arrow 634. The ASN-GW 414 may send an R4_HO_ACK message to the IOM 202 at arrow 636. The ASN-GW 414 may perform context retrieval with authenticator ASN at block 684. The mobile device 210 may switch on the first radio module 102 at block 686. The mobile device 210 and the ASN-GW 414 may engage in data path registration procedures at arrow 638. The ASN-GW 414 may send an R4_HO_COMPLETE message to the IOM 202 at arrow 640. Further details for operations and messages represented by the arrows 632-640 and blocks 684, 686 may be specified in section 4.7.2.2 of the NWG Stage 3 Specification.

As shown in FIG. 6B, assuming the ASN-GW 414 supports Proxy Mobile IP version 6 (PMIP6) as a mobility protocol, a PMIP6 tunnel is established between the ASN-GW 414 and the HA 432. Applications for Mobile IP such as WiMAX and CDMA2000 networks use a technique termed Proxy Mobile IP (PMIP). PMIP introduces a Mobility Access Gateway (MAG) into the Mobile IP (MIP) architecture which interacts with the HA 532, termed a Local Mobility Anchor (LMA) in Proxy MIP terminology, on behalf of the mobile device 210. With PMIP or PMIP6, the use of MIP in the network is transparent to the mobile device 210. The ASN-GW 414 sends a Proxy Binding Update message to the HA 432 at arrow 642. The HA 432 sends a message to the PCRF 502 to initiate a PCEF Initiated IP-CAN Session Modification procedure at arrow 644. The HA 432 sends a Proxy Binding Acknowledgment message to the ASN-GW 414 at arrow 646. A PMIP6 tunnel is established between the mobile device 210 through the ASN-GW 414 and the HA 432 to the PCRF 502 at arrows 648, 650 and 652. The mobile device 210 can send/receive IP packets over the first wireless network 206a (e.g., the Mobile WiMAX access) at this point.

Figure 7:
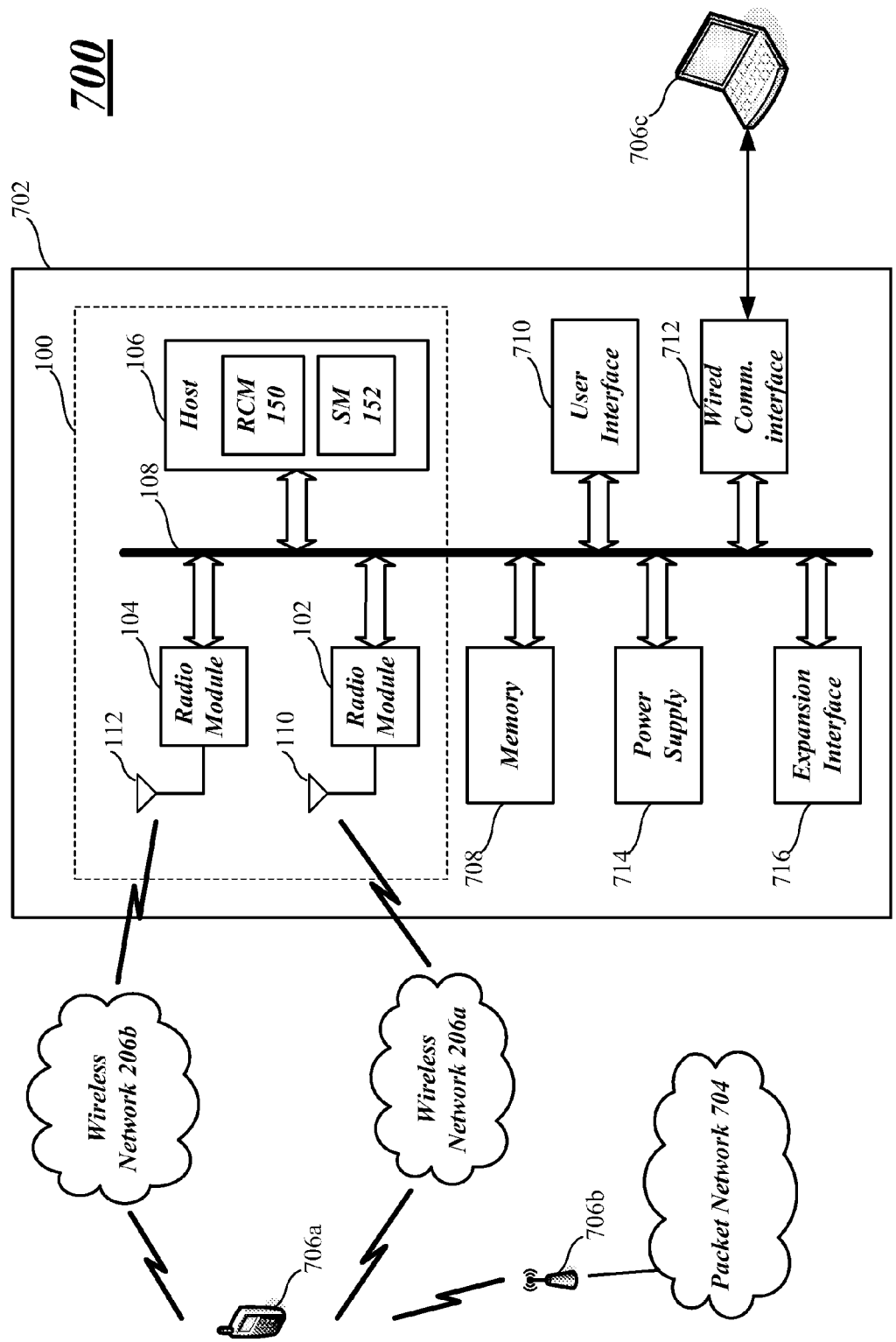
FIG. 7 illustrates one embodiment of a third system with multiple devices.

FIG. 7 illustrates an embodiment of a system 700. This system may be suitable for use with one or more embodiments described herein. Accordingly, system 700 may engage in wireless communications across various link types, such as the ones described herein. In addition, system 700 may perform various user applications.

As shown in FIG. 7, system 700 may include a mobile device 702, multiple communications networks 206, and one or more remote devices 706. FIG. 7 shows that the mobile device 702 may include the elements of FIGS. 1, 2 and 4. For instance, the mobile device 702 may include the elements of apparatus 100 and/or the mobile device 210. In the illustrated embodiment shown in FIG. 7, the mobile device 702 may include a memory 708, a user interface 710, a wired communications interface 712, a power supply 714, and an expansion interface 716.

The mobile device 702 may illustrate any mobile device with wireless communications capabilities suitable for implementing various embodiments as described herein. Examples for the mobile device 702 may include a mobile station, a mobile telephone, a cellular telephone, software telephone phone running on a computer, or other suitable computing devices having computing and communications capabilities in accordance with the described embodiments. Exemplary computing devices may include a handheld computer, palmtop computer, personal computer (PC), desktop PC, notebook PC, laptop computer, smart phone, mobile telephone, personal digital assistant (PDA), combination mobile telephone/PDA, mobile computing device, user equipment (UE), mobile unit, subscriber station, video device, television (TV) device, digital TV (DTV) device, high-definition TV (HDTV) device, media player device, gaming device, messaging device, pager, mobile internet device, tablet, netbook, or any other suitable communications device in accordance with the described embodiments.

Memory 708 may store information in the form of data. For instance, memory 708 may contain application documents, e-mails, sound files, and/or images in either encoded or unencoded formats. Alternatively or additionally, memory 708 may store control logic, instructions, and/or software components. These software components include instructions that can be executed by one or more processors. Such instructions may provide functionality of one or more elements in system 700. Exemplary elements include host 106, one or more components within radio modules 102 and 104, user interface 710, and/or communications interface 712.

Memory 708 may be implemented using any machine-readable or computer-readable media capable of storing data, including both volatile and non-volatile memory. For example, memory 708 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 708 may be included in other elements of system 700. For instance, some or all of memory 708 may be included on a same integrated circuit or chip with elements of apparatus 100. Alternatively some portion or all of memory 708 may be disposed on an integrated circuit or other medium, for example a hard disk drive, which is external. The embodiments are not limited in this context.

User interface 710 facilitates user interaction with the mobile device 702. This interaction may involve the input of information from a user and/or the output of information to a user. Accordingly, user interface 710 may include one or more devices, such as a keyboard (e.g., a full QWERTY keyboard), a keypad, a touch screen, a microphone, and/or an audio speaker. In addition, user interface 710 may include a display to output information and/or render images/video processed by the mobile device 702. Exemplary displays include liquid crystal displays (LCDs), plasma displays, and video displays.

Wired communications interface 712 provides for the exchange of information with a device 706c, such as a personal computer or network server. This exchange of information may be across one or more wired connections. Examples of such connections include USB interfaces, parallel interfaces, and/or serial interfaces. In addition, interface 712 may provide for such exchanges across wireless connections(s). An infrared interface is an example of such a connection. The information exchanged with such devices may include various application files and content (e.g., audio, image, and/or video).

Wired communications interface 712 may include various components, such as a transceiver and control logic to perform operations according to one or more communications protocols. In addition, communications interface 712 may include input/output (I/O) adapters, physical connectors to connect the I/O adapter with a corresponding communications medium.

FIG. 7 shows that the mobile device 702 may communicate across wireless networks 206a and 206b. In particular, FIG. 7 shows communications across network 206b being handled by second radio module 104, and communications across network 206a being handled by first radio module 102. Accordingly, the first and second wireless networks 206a, 206b may each be a cellular network, a wireless data network, or a combination of both. However, the embodiments are not limited to these examples.

Such wireless communications allow the mobile device 702 to communicate with various remote devices. For instance, FIG. 7 shows the mobile device 702 engaging in wireless communications (e.g., telephony or messaging) with a mobile device 706a. In addition, FIG. 7 shows device engaging in wireless communications (e.g., WLAN, WMAN, and/or PAN communications) with an access point 706b. In turn access point 706b may provide the mobile device 702 with access to further communications resources. For example, FIG. 7 shows access point 706b providing access to a packet network 704, such as the Internet.

Power supply 714 provides operational power to elements of the mobile device 702. Accordingly, power supply 714 may include an interface to an external power source, such as an alternating current (AC) source. Additionally or alternatively, power supply 714 may include a battery. Such a battery may be removable and/or rechargeable. However, the embodiments are not limited to these examples.

Expansion interface 716 may be in the form of an expansion slot, such as a secure digital (SD) slot. Accordingly, expansion interface 716 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising: a first radio module operative to establish a first wireless link over a first wireless network with a first network device; a second radio module operative to establish a second wireless link over a second wireless network with a second network device; and a radio control module communicatively coupled to the first and second radio modules, the radio control module operative to send preregistration information for a mobile device to the second wireless network when connected to the first wireless network, determine whether to connect to the second wireless network, and establish the second wireless link over the second wireless network with the second network device using the preregistration information, the radio control module operative to control operations for each radio in accordance with a single radio architecture in cooperation with an interworking operations module associated with the first wireless network and the second wireless network, the interworking operations module comprising first and second network interfaces operative to emulate respective network devices for the respective first and second wireless networks to mimic behavior of the respective network devices, the first wireless network comprising a Worldwide Interoperability for Microwave Access (WiMAX) network, the second wireless network comprising a Third Generation Partnership Project (3GPP) network, the first network interface emulating a WiMAX access service network (ASN) logical entity, the second network interface emulating a serving general packet radio service (GPRS) support node (SGSN), the interworking operations module comprising an address provisioned in the mobile device or discoverable through a domain name service (DNS) query.

2. The apparatus of claim 1, the radio control module operative to turn on a first transceiver for the first radio module and turn off a second transceiver for the second radio module, the first transceiver to connect to the first wireless network through the first network device when turned on, and when connected to the first wireless network, the radio control module to send the preregistration information for the mobile device to the second wireless network.

3. The apparatus of claim 1, the radio control module operative to determine to connect to the second wireless network, turn on a second transceiver for the second radio module and turn off a first transceiver for the first radio module, the second transceiver to connect to the second wireless network through the second network device when turned on using the preregistration information for the mobile device.

4. The apparatus of claim 1, the first and second radio modules each comprising a transceiver and a communications controller, the communications controllers to communicate status information to each other and coordinate handover operations for the respective transceivers in accordance with the status information.

5. The apparatus of claim 1, the first and second radio modules each comprising a transceiver and a communications controller, the communications controllers to communicate status information with the radio control module, the radio control module operative to control handover operations for the transceivers via the respective communications controllers in accordance with the status information.

6. The apparatus of claim 1, comprising an omni-directional antenna communicatively coupled to each of the first and second radio modules.

7. An apparatus, comprising: a memory to store an interworking operations module; a processor communicatively coupled to the memory, the processor to execute the interworking operations module; and the interworking operations module when executed by the processor operative to communicate control signals between a first wireless network and a second wireless network, the interworking operations module comprising first and second network interfaces operative to emulate respective network devices for the respective first and second wireless networks to mimic behavior of the respective network devices, and communicate preregistration information for a mobile device to the respective first and second wireless networks, the first wireless network comprising a (Worldwide Interoperability for Microwave Access (WiMAX) network, the second wireless network comprising a Third Generation Partnership Project (3GPP) network, the first network interface emulating a WiMAX access service network (ASN) logical entity, the second network interface emulating a serving general packet radio service (GPRS) support node (SGSN), the interworking operations module comprising an address provisioned in the mobile device or discoverable through a domain name service (DNS) query.

8. The apparatus of claim 7, the interworking operations module to communicate with the mobile device through the first network interface when the mobile device is connected to the first wireless network.

9. The apparatus of claim 7, the interworking operations module to communicate with the mobile device through the second network interface when the mobile device is connected to the second wireless network.

10. A method, comprising: establishing a first wireless link over a first wireless network between a mobile device and a first network device; sending preregistration information for the mobile device to a second wireless network through an interworking operations module comprising first and second network interfaces operative to emulate respective network devices for the respective first and second wireless networks to mimic behavior of the respective network devices, the first wireless network comprising a Worldwide Interoperability for Microwave Access (WiMAX) network, the second wireless network comprising a Third Generation Partnership Prosect (3GPP) network, the first network interface emulating a WiMAX access service network (ASN) logical entity, the second network interface emulating a serving general packet radio service (GPRS) support node (SGSN), the interworking operations module comprising an address provisioned in the mobile device or discoverable through a domain name service (DNS) query; determining whether to connect to the second wireless network; and establishing a second wireless link over the second wireless network between the mobile device and a second network device using the preregistration information.

11. The method of claim 10, comprising discovering the interworking operations module associated with the first wireless network and the second wireless network.

12. The method of claim 10, comprising establishing a secure connection with the interworking module associated with the first wireless network and the second wireless network.

13. The method of claim 10, comprising determining whether to send preregistration information to the second wireless network through the interworking operations module.

14. The method of claim 10, comprising performing authentication operations for the mobile device and the second wireless network.

15. The method of claim 10, comprising performing location update operations for the mobile device and the second wireless network.

16. The method of claim 10, comprising performing packet data protocol context activation for the mobile device and the second wireless network.

17. The method of claim 10, comprising determining whether to perform handover operations to handover the mobile device from the first wireless network to the second wireless network.

18. The method of claim 10, comprising performing handover operations to handover the mobile device from the first wireless network to the second wireless network using the preregistration information.

19. The method of claim 10, comprising releasing the first wireless link over the first wireless network between the mobile device and the first network device.

20. An article of manufacture comprising a non-transitory storage medium containing instructions that when executed enable a system to: establish a first wireless link over a first wireless network between a mobile device and a first network device; discover an interworking operations module associated with the first wireless network and a second wireless network, the interworking operations module comprising first and second network interfaces operative to emulate respective network devices for the respective first and second wireless networks to mimic behavior of the respective network devices, the first wireless network comprising a Worldwide Interoperability for Microwave Access (WiMAX) network, the second wireless network comprising a Third Generation Partnership Project (3GPP) network, the first network interface emulating a WiMAX access service network (ASN) logical entity, the second network interface emulating a serving general packet radio service (GPRS) support node (SGSN), the interworking operations module comprising an address provisioned in the mobile device or discoverable through a domain name service (DNS) query; pre-register the mobile device with the second wireless network through the interworking operations module; determine whether to connect to the second wireless network; and establish a second wireless link over the second wireless network between the mobile device and a second network device.

21. The article of claim 20, further comprising instructions that when executed enable the system to establish a connection with the interworking module.

22. The article of claim 20, further comprising instructions that when executed enable the system to determine whether to perform pre-registration operations with the second wireless network through the interworking operations module.

23. The article of claim 20, further comprising instructions that when executed enable the system to determine whether to perform handover operations to handover the mobile device from the first wireless network to the second wireless network.

24. The article of claim 20, further comprising instructions that when executed enable the system to perform handover operations to handover the mobile device from the first wireless network to the second wireless network.

* * * * *